US009195416B2

(12) United States Patent
Bhatia (10) Patent No.: US 9,195,416 B2
(45) Date of Patent: Nov. 24, 2015

(54) PRINTING FOR-PAY CONTENT (75) Inventor: Rajesh Bhatia, Bangalore Karnataka (IN)

(73) Assignee: HEWLETT-PACKARD DEVELOPMENT COMPANY, L.P., Houston, TX (US)

(*) Notice: Subject to any disclaimer, the term of this patent is extended or adjusted under 35 U.S.C. 154(b) by 266 days.

(21) Appl. No.: 13/277,023

(22) Filed: Oct. 19, 2011

(65) Prior Publication Data
US 2013/0103575 A1 Apr. 25, 2013

(51) Int. Cl.
*G06F 21/00* (2013.01)
*G06F 3/12* (2006.01)

(52) U.S. Cl.
CPC ............ *G06F 3/1222* (2013.01); *G06F 3/126* (2013.01); *G06F 3/1288* (2013.01); *G06F 3/1238* (2013.01)

(58) Field of Classification Search
USPC ............ 705/59, 16, 21, 71; 380/44, 262, 278, 380/279
See application file for complete search history.

(56) References Cited

U.S. PATENT DOCUMENTS

| 6,795,205 B1* | 9/2004 | Gacek ........................... 358/1.15 |
| 7,031,661 B2 | 4/2006 | Berkema et al. |
| 7,385,718 B2 | 6/2008 | Berkema et al. |
| 8,169,635 B2* | 5/2012 | Kondo et al. ................ 358/1.15 |
| 2003/0010818 A1* | 1/2003 | Asawaka ....................... 235/379 |
| 2003/0081252 A1* | 5/2003 | Silverbrook et al. ......... 358/1.15 |
| 2004/0196486 A1* | 10/2004 | Uchino ......................... 358/1.14 |
| 2004/0196491 A1* | 10/2004 | Uchino ......................... 358/1.15 |
| 2004/0254887 A1* | 12/2004 | Jacoby ............................ 705/52 |
| 2005/0080682 A1 | 4/2005 | Wilson |
| 2005/0165641 A1* | 7/2005 | Chu et al. ........................ 705/14 |
| 2006/0268334 A1* | 11/2006 | Nakamura .................... 358/1.15 |
| 2007/0156534 A1* | 7/2007 | Lerner et al. .................... 705/14 |
| 2007/0156634 A1* | 7/2007 | Martin ............................. 707/1 |
| 2008/0231886 A1 | 9/2008 | Wehner et al. |
| 2011/0058208 A1 | 3/2011 | Takahashi |
| 2011/0096354 A1 | 4/2011 | Liu |
| 2011/0235120 A1* | 9/2011 | Kinoshita et al. ............. 358/1.15 |
| 2012/0072317 A1* | 3/2012 | O'Neil ............................. 705/30 |
| 2012/0271890 A1* | 10/2012 | Judge et al. ................... 709/206 |
| 2012/0300249 A1* | 11/2012 | Shustef et al. ................ 358/1.15 |

OTHER PUBLICATIONS

Agarwal, A.; "New HP Printers Support Web Printing via Email"; Digital Inspiration; Jul. 7, 2010; 4 pages.

* cited by examiner

*Primary Examiner* — Dante Ravetti
(74) *Attorney, Agent, or Firm* — Michael A. Dryia (57) ABSTRACT

In one embodiment, an email communication is received via a network. The email communication includes a content identifier identifying for-pay content hosted at a provider computing system, a sender identifier identifying a sender of the communication, and a printer identifier identifying a network-connected printer. The sender identifier is compared to a database that associates sender identifiers with payment subscriptions authorizing printing of the content. Responsive to receipt of data indicating the sender identifier is associated with a payment subscription, the content is obtained from the provider system, rasterized, and sent to the printer for printing.

20 Claims, 6 Drawing Sheets

PRINTING FOR-PAY CONTENT

BACKGROUND

Certain network-connected printers are capable of sending and receiving communications and printable content without being connected to a desktop computer, laptop computer, or other host computing device. Such functionality can provide considerable flexibility and efficiencies, as a user may have the ability to send content to the printer via an email communication without the complications of first downloading a printing application at or establishing a connection with a host computing device.

BRIEF DESCRIPTION OF THE DRAWINGS

The accompanying drawings illustrate various embodiments and are a part of the specification. The illustrated embodiments are examples and do not limit the scope of the claims. Throughout the drawings, identical reference numbers designate similar, but not necessarily identical elements.

The same part numbers designate the same or similar parts throughout the figures.

DETAILED DESCRIPTION OF EMBODIMENTS

An email-based printing system enables a user to send content to an internet-connected printer for printing without the need to install a printer driver or other printing application at the sending device. Such systems are well-received by users due to the ease of printing generally-available content. However, difficulties can arise with established email-based printing systems that they do not provide for easy and secure printing of "for-pay" content. User experience with email-based printing would be enhanced by the providing of a system for printing for-pay content that is easy to use, is protective of payment information, and includes user authentication features.

Accordingly, various embodiments described herein were developed in an effort to provide a system for printing for-pay content. In an embodiment, a computer system receives an email-based request from a user to print for-pay content at an internet-connected printer. The computer system makes an association of the sender of the email with a payment subscription. After confirmation that a payment subscription is associated with the sender, the computer system obtains the content from a content provider and sends the content to the internet-connected printer for printing. In an embodiment, the computer system additionally obtains payment via a payment protocol associated with the subscription. It should be noted that while the disclosure is discussed frequently with references to an internet and internet-connected printers, the teachings of the present disclosure are not so limited and can be applied to any network and network-connected printers.

A "network-connected printer" refers to a printer that is connected to a network, to be capable of obtaining content, sending and receiving messages, accessing network content, and/or accessing applications via a network. In examples, the network may be a proprietary network, a secured network, an open network, an intranet, an extranet, an internet or the Internet. "Content" refers to any text, image, or other information that can be received by and stored at computer system for later display, printing or other presentation to a user. "Printer" or "printing device" refers to any electronic device that prints and includes multifunctional electronic devices that perform additional functions such as scanning and/or copying. An "identifier" for a sender, content, or printer refers to something that identifies, indicates, or names a sender, content or printer. "For-pay content" refers to content that can be printed in connection with payment of a charge or fee. For-pay content is to be distinguished from general content that can be printed without payment of a charge or fee. A "payment subscription" refers to data evidencing that a user has paid, contracted to pay, or agreed to pay for for-pay content. A "payment protocol" refers to a protocol for obtaining or reconciling payment for for-pay content. "Rasterizing" content refers to processing or rendering of content to a format that can be understood and/or better understood by a printer. A "recipient field" of an email communication is a portion of an email that includes identifies a user or entity to which an email communication is to be routed. A recipient field is sometimes also referred to as a "to field." A "sender field" of an email communication is a portion of an email that identifies a user or entity that is sending the email communication. The sender field is sometimes referred to a "from field."

Figure 1:
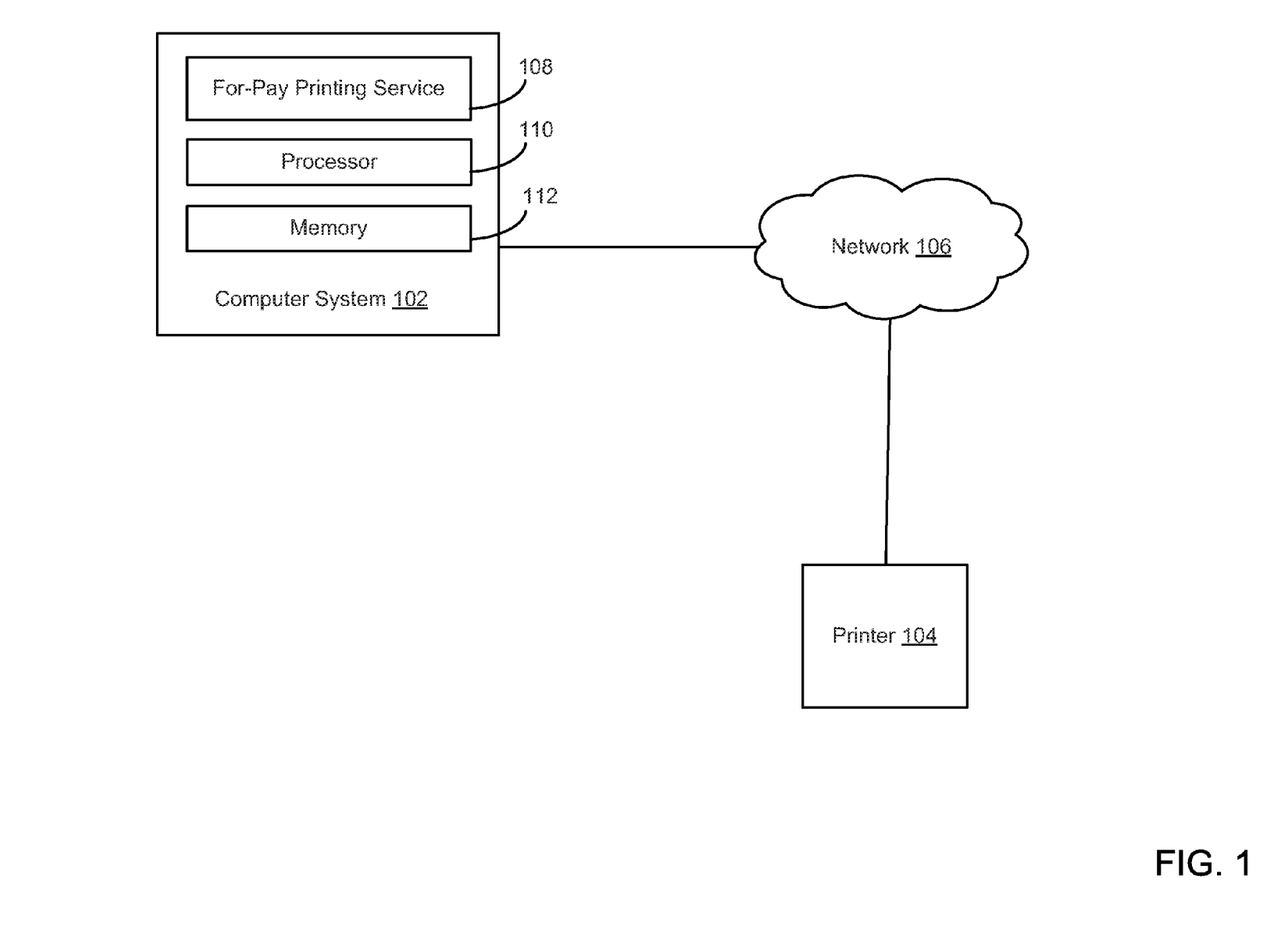
FIG. 1 is a block diagram illustrating a system according to various embodiments.

FIG. 1 is a block diagram illustrating a system according to various embodiments. FIG. 1 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these.

FIG. 1 shows a computer system 102 and a printer 104 connected to a network 106. Computer system 102 represents generally any computing device or group of computing devices capable of sending network requests and content to, and otherwise communicating with printer 104. Printer 104 represents generally a computing device that is operable to produce printed output and to send and receive communications and content to each other over network 106. In embodiments, computer system 102 may be or include a server, desktop computer, laptop computer, mobile computing device, tablet computer, and/or any other computing device.

Network 106 represents generally hardware components and computers interconnected by communications channels that allow sharing of resources and information. Network 106 may include one or more of a cable, wireless, fiber optic, or remote connection via a telecommunication link, an infrared link, a radio frequency link, or any other connectors or systems that provide electronic communication. Network 106 may include, at least in part, an intranet, the internet, or a combination of both. Network 106 may also include intermediate proxies, routers, switches, load balancers, and the like. The paths followed by network 106 between printer computing device 102 and printer 104 as depicted in FIG. 1 represent the logical communication paths between these devices, not necessarily the physical paths between the devices.

Computing system 102 includes a for-pay printing service 108. For-pay printing service 108 represents generally any combination of hardware and programming configured to enable easy and secure printing of for-pay content at a network-connected printer. The for-pay printing service 108 receives via a network an email communication including a content identifier identifying for-pay content hosted at a provider computing system, a sender identifier identifying a sender of the communication, and a printer identifier identifying a network-connected printer. In an example, the content identifier may be or include a Uniform Resource Locator ("URL") that specifies an address at which the content is available via internet 206. In an example, the sender identifier is or includes an email address included in the sender field of the communication. In an example, the printer identifier is, or includes, an email address included in the recipient field of the communication.

The for-pay printing service 108 compares the sender identifier to a database that includes associations of sender identifiers with payment subscriptions authorizing printing of the content. If the comparison reveals that the sender identifier is included within the listing of sender identifiers in the database, and that there is a payment subscription associated with the sender identifier, the for-pray printing service 108 obtains the content from the provider system. The for-pay printing service 108 rasterizes the content, and sends the rasterized content to the network-connected printer for printing.

The functions and operations described with respect to computer system 102 may be implemented as a computer-readable storage medium containing instructions executed by a processor (e.g., processor 110) and stored in a memory (e.g., memory 112). In a given implementation, processor 110 may represent multiple processors, and memory 112 may represent multiple memories. Processor 110 represents generally any instruction execution system, such as a computer/processor based system or an ASIC (Application Specific Integrated Circuit), a computer, or other system that can fetch or obtain instructions or logic stored in memory 112 and execute the instructions or logic contained therein. Memory 112 represents generally any memory configured to store program instructions and other data.

Figure 2:
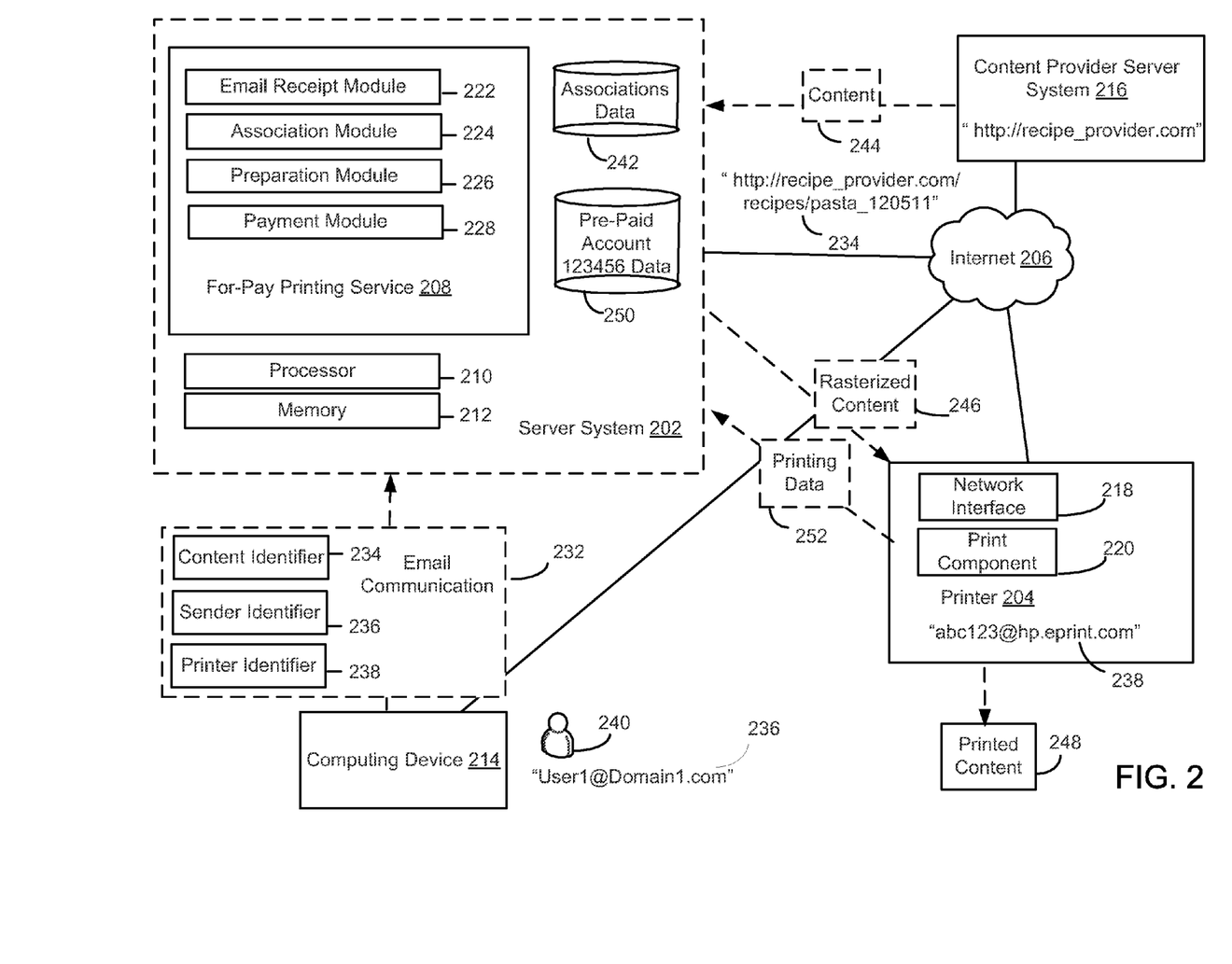
FIG. 2 is a block diagram illustrating a system according to various embodiments.

FIG. 2 is a block diagram that includes a server system 202 according to various embodiments. FIG. 2 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these.

FIG. 2 shows server system 202, printer 204, computing device 214, and content provider server system 216 connected to internet 206. Computing device 214 represents generally any computing device or group of computing devices capable of sending an email communications to, and otherwise communicating with, server system 202 via internet 206. In examples, computing device 214 may be a desktop computer, laptop computer, tablet computer, smart phone, or any other computing device or group of computing devices. Content provider server system 214 represents generally any computing device or group of computing devices capable of receiving requests for content from, sending content to, and otherwise communicating with, server system 202 via internet 206. In an example, content provider server system may be a server computing device or server system of computing devices.

Printer 204 is shown to include network interface 218 and print component 220. Network interface 218 represents generally any combination of hardware and programming configured for electronically connecting printer 204 to internet 206. Print component 220 represents generally any combination of hardware and programming configured to produce printed output.

Server system 202 represents generally any computing device or group of computing devices capable of accepting, processing, storing and outputting data according to programmed instructions. As illustrated in FIG. 2, server system 202 may be a single physical device or it may be distributed among multiple physical devices connected over a network (e.g., the Internet). For example, server system 202 may represent a cloud computing infrastructure (i.e., the cloud). In a cloud computing infrastructure, various components/modules of server system 202 may share resources and/or act in concert even though they might be in different physical locations and/or operating on different physical devices.

Server system 202 is shown to include a for-pay printing service 208, an associations database 242, and a prepaid account database 250. For-pay printing service 208 represents generally any combination of hardware and programming configured to enable easy and secure printing of for-pay content at network-connected printers. For-pay printing service 208 includes an email receipt module 222, association module 224, preparation module 226, and payment module 228. Email receipt module 222 represents generally any combination of hardware and programming configured to receive an email communication 232 via internet 206. The email communication 232 includes a content identifier 234 identifying for-pay content hosted at a provider computing system. The email communication 232 additionally includes a sender identifier 236 identifying a sender 240 of the communication. The email communication additionally includes a printer identifier 238 identifying network-connected printer 204.

Figure 3:
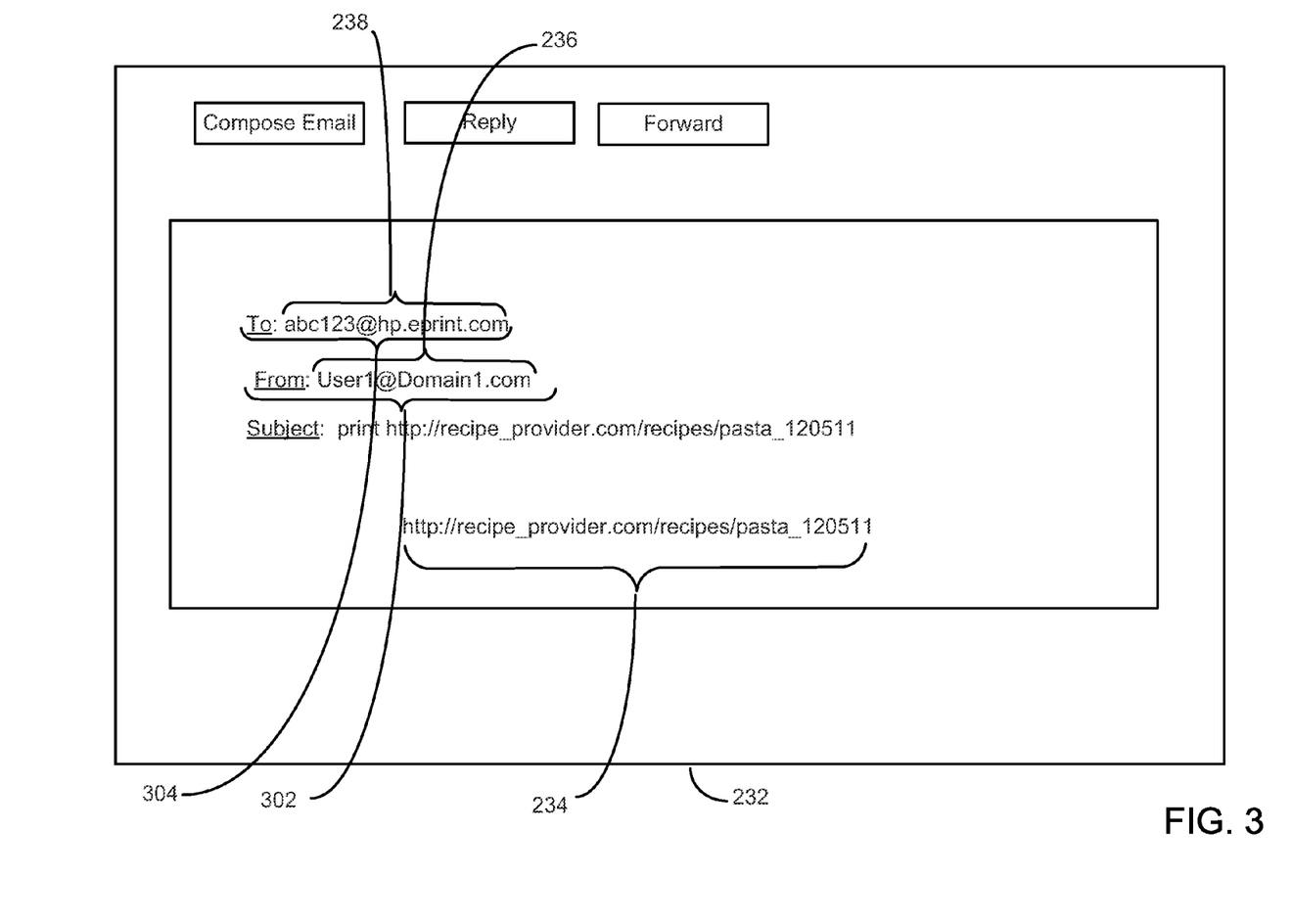
FIG. 3 is an example display that may be presented during the sending and/or receiving of an email communication.

FIG. 3 is an example display that may be presented during the sending and/or receiving of email communication 232 of FIG. 2 from computing device 214 to server system 202. In an example, the display of FIG. 3 may be displayed to a sender user 240 at computing device 214 as the email 232 is constructed and sent to server system 202. In this example, the email 232 sent to server system 202 includes a content identifier 234 "http://recipe_provider.com/recipes/pasta_120511" in URL format. In this example, the email 232 includes in a sender field 302 a sender identifier 236 indicating that a user 240 (FIG. 2) with the email address "User1@Domain1.com" sent the email 232. In this example, the email 232 includes in a recipient field 304 printer identifier 238 in the form of printer email address "abc123@hp.eprint.com."

Figure 4:
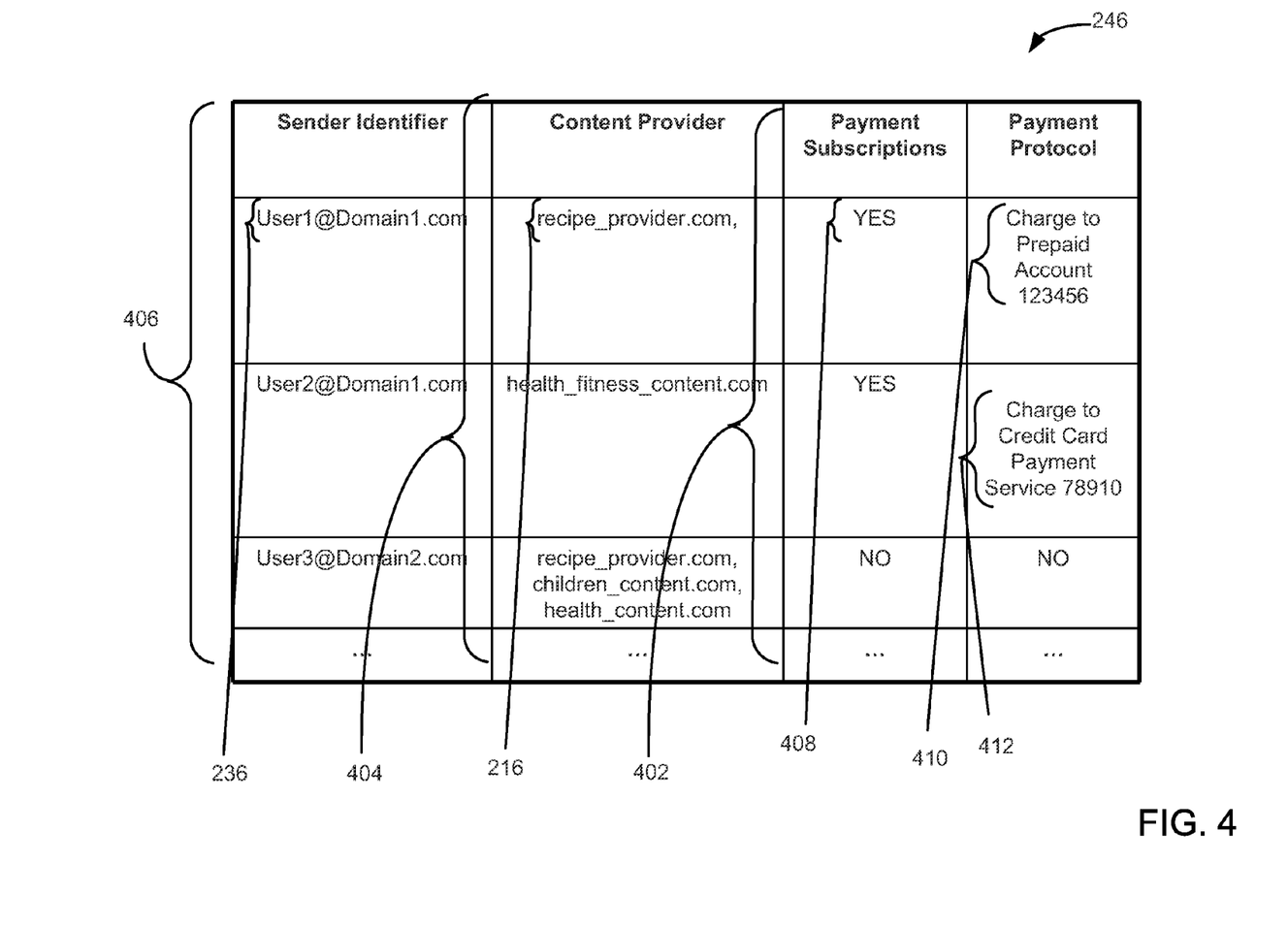
FIG. 4 is an example associations database, according to various embodiments.

Returning to FIG. 2, association module 224 compares sender identifier 236 to an associations database 242 that associates sender identifiers with payment subscriptions authorizing printing of the content. FIG. 4 provides an example of an associations database, according to various embodiments. In this example, the associations database 242 holds a set of sender identifiers 406 including "User1@Domain1.com", "User2@Domain1.com", and "User3@Domain2.com." The identifiers "User1@Domain1.com" and "User2@Domain1.com" are associated with payment subscriptions 402 for certain content 404. The sender identifier "User3@Domain2.com" represents a user that has an interest in, or is otherwise grouped with, content 404, but does not have an associated payment subscription.

Returning to the example of FIG. 2, in view of FIGS. 3 and 4, the association module 224 compares the "User1@Domain1.com" sender identifier 236 to the associations database 242. The association module 224 confirms that that sender identifier 236 is included in the set 406, and confirms via the "YES" in the payment subscriptions column (FIG. 4) that the identifier 236 is associated with a payment subscription 402 for the "recipe_provider.com" content provider 216 that hosts the requested content 234. In the example of FIGS. 2-4, the payment subscription 408 applicable to sender identifier "User1@Domain1.com" 236 is associated with a payment protocol 410. Payment protocol 410 includes an instruction to charge or debit a prepaid account for user 240 stored at pre-paid account database 250.

Returning to FIG. 2, preparation module 226, in response to receipt of data from the association module 224 indicating the sender identifier 236 is associated with a payment subscription 408, obtains the content 244 (that was named in the email communication 232 via the content identifier 234) from content provider server system 216. In embodiments, the content may be received at server system 202 via a networking protocol, including but not limited to Transmission Control Protocol/Internet Protocol ("TCP/IP"), HyperText Transfer Protocol ("HTTP"), Simple Mail Transfer Protocol ("SMTP"), Extensible Messaging and Presence Protocol ("XMPP") and/or Session Initiation Protocol ("SIP").

Preparation module 226 rasterizes the received content 244 to render the content to a format that can be understood, or better understood, by printer 204. In an example, the raster processing includes utilizing vector digital instructions as to how the content is to be printed to create a high resolution raster or bitmap image of the content. The instructions may be expressed in a number of various languages and formats, including but not limited to HPGL/2 (Hewlett-Packard Graphics Language 2), PostScript, PDF (Portable Document Format), JPEG (Joint Photographic Experts Group standard), TIFF (Tagged Image File Format), PCL3 (Printer Command Language 3) and PCL 6 (Printer Command Language 6). In embodiments, the raster processing may apply smoothing or interpolation algorithms to an input bitmap of the content to generate an output bitmap image. Following completion of the raster processing, preparation module 226 sends the rasterized content 246 to printer 204 for printing. Printer 204 in turn produces as output printed content 248.

Payment module 228 obtains from associations database 242 a payment protocol 410 associated with the "User1@Domain1.com" sender identifier 236. Moving to FIG. 4, in this example the payment protocol 410 is an instruction to obtain payment for the printing of the content 244 (FIG. 2) via charging a prepaid account "123456" that has been funded by user 240. In this example, payment module 228 obtains payment via making a charge or debit to the prepaid account database 250 identified in the payment protocol 410. In another embodiment, the prepaid account to be charged may be identified in the payment subscription 402.

In the example of FIG. 2, payment module 228 is triggered to obtain payment in response to receipt, from the printer 204, of data 252 confirming the printing and/or output of printed content 284 at printer 204. In another embodiment, the receipt of the content 244 at server system 202 from content provider server system 216 triggers payment module 228 to obtain payment. In another embodiment, the sending of the rasterized content 246 from server system 202 to printer 204 triggers payment module 228 to obtain payment.

The functions and operations described with respect to for-pay printing service 208 and server system 202 may be implemented as a computer-readable storage medium containing instructions executed by a processor (e.g., processor 210) and stored in a memory (e.g., memory 212). In a given implementation, processor 210 may represent multiple processors, and memory 212 may represent multiple memories.

Figure 5:
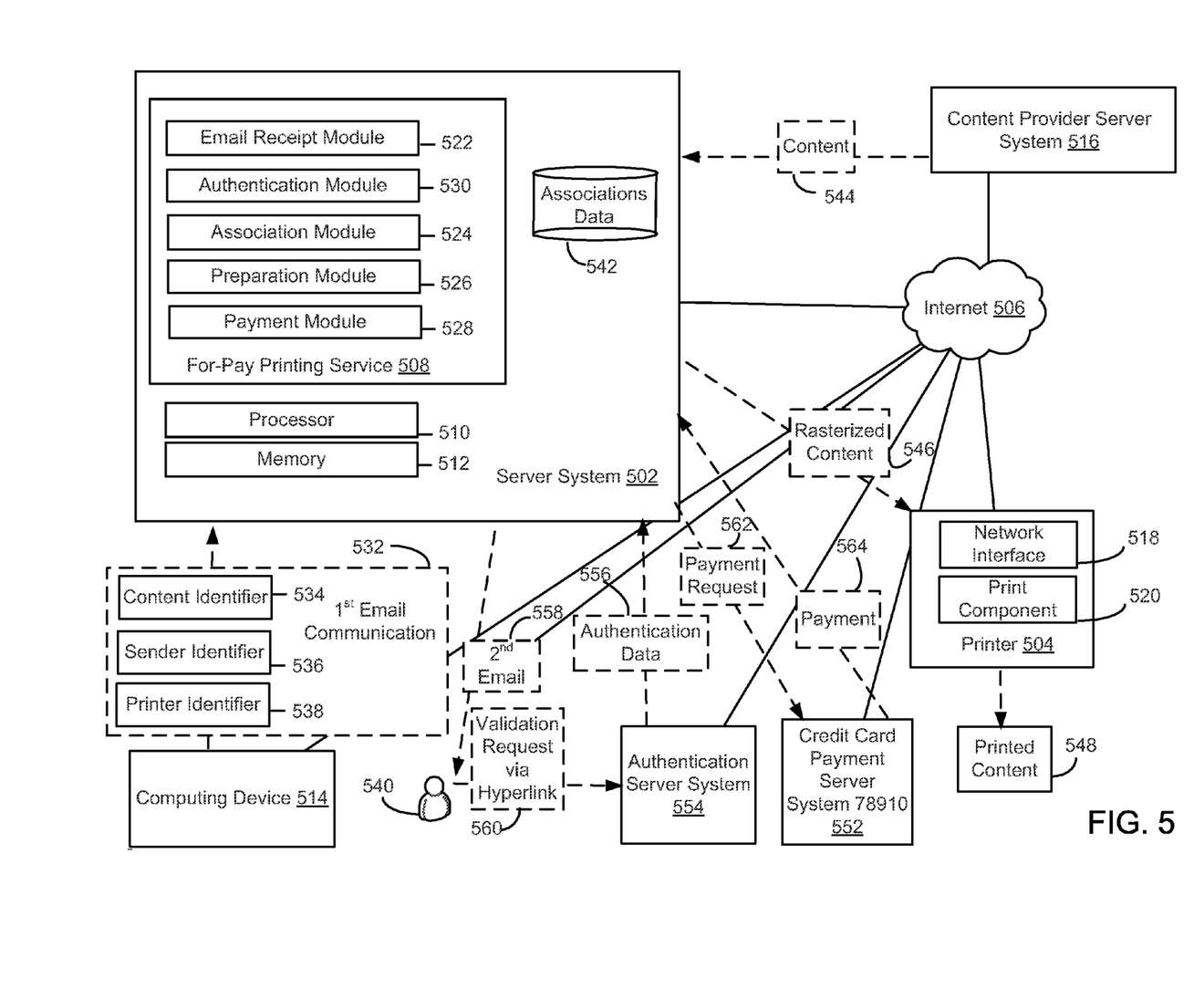
FIG. 5 is a block diagram illustrating a system according to various embodiments.

FIG. 5 is a block diagram that includes a server system 502 according to various embodiments. FIG. 5 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these.

FIG. 5 shows server system 502, printer 504, computing device 514, content provider server system 516, authentication server system 554, and payment server system 552 connected to internet 506. Computing device 514 represents generally any computing device or group of computing devices capable of sending an email communications to, and otherwise communicating with, server system 502 via internet 506. In examples, computing device 514 may be a desktop computer, laptop computer, tablet computer, smart phone, or any other computing device or group of computing devices. Content provider server system 516 represents generally any computing device or group of computing devices capable of receiving requests for content from, sending content to, and otherwise communicating with, server system 502 via internet 506. In an example, content provider server system 516 may be a server computing device or server system of computing devices. Authentication server system 554 represents generally any computing device or group of computing devices capable of receiving sender identifier authentication requests from, sending sender authorization data to, and otherwise communicating with, server system 502 via internet 506. Payment server system 552 represents generally any computing device or group of computing devices capable of receiving payment requests from, sending payments and/or payment confirmations to, and otherwise communicating with, server system 502 via internet 506.

Printer 504 is shown to include network interface 518 and print component 520. Network interface 518 represents generally any combination of hardware and programming configured for electronically connecting printer 504 to internet 506. Print component 520 represents generally any combination of hardware and programming configured to produce printed output.

Server system 502, represents generally any computing device or group of computing devices capable of accepting, processing, storing and outputting data according to programmed instructions. As illustrated in FIG. 5, server system 502 may be a single physical device or it may be distributed among multiple physical devices connected over a network (e.g., the Internet). For example, server system 502 may represent a cloud computing infrastructure (i.e., the cloud). In a cloud computing infrastructure, various components/modules of server system 502 may share resources and/or act in concert even though they might be in different physical locations and/or operating on different physical devices.

Server system 502 is shown to include a for-pay printing service 508, and an associations database 542. For-pay printing service 508 represents generally any combination of hardware and programming configured to enable easy and secure printing of for-pay content at network-connected printers. For-pay printing service 508 includes an email receipt module 522, authentication module 530, association module 524, preparation module 526, and payment module 528. Email receipt module 522 represents generally any combination of hardware and programming configured to receive an first email communication 532 via internet 506. The first email communication 532 includes a content identifier 534 identifying for-pay content hosted at a provider computing system. The first email communication 532 additionally includes a sender identifier 536 identifying a sender 540 of the communication. The first email communication additionally includes a printer identifier 538 identifying network-connected printer 504.

Responsive to receipt of the first email communication 532, authentication module 530 performs a sender identifier authentication procedure. This sender identifier authentication procedure provides assurance to server system 502 that the sender identifier 536 of the first email communication 532 is not a spoofed, or otherwise counterfeited, sender identifier. In one example, the sender identifier authentication procedure is a sender identifier versus network pathway authentication procedure that confirms that the network path traversed in the delivery of the first email communication 532 is consistent with the email address included within the sender identifier 536. In an example, the procedure includes obtaining from an authentication server system 554 data 556 that the domain named within the sender identifier is Sender Policy Framework ("SPF") or Security Identifier ("SID") enabled. For purposes of this application, a domain is said to be SPF or SID enabled if it can be confirmed, via a SPF or SID protocol, that the first email 532 is received from a host sanctioned by the named domain. Upon the authentication module determining that the domain is SPF or SID enabled, the sender identifier 536 is deemed authenticated and the email request to print for-pay content is processed.

In another example, the sender identifier 536 in email 532 includes a domain name representing an entity that has a group subscription to receive content from content provider server system 516 (the entity is hereinafter referred to in this example as the "subscription entity"). In such an example, the authentication procedure may have two steps. In a first step, the authentication module 530 confirms, via a SPF or SID protocol, that email 532 is received from a host sanctioned by the subscription entity. In a second step, authentication module 530 conducts another sender identifier 536 authentication process via an Open Authorization ("OAuth") protocol or similar authentication protocol. In an example of the second step, authentication module 530 may send a consumer key to content provider server system 516. Responsive to receipt of the consumer key, content provider server system 516 may return a request token to authentication module 530. In this example, authentication module 530 has previously obtained group access credentials for the subscription entity (including user 540 as identified by send identifier 536), and may use the group credentials to communicate with content provider server system 516 on behalf of the subscription entity and user 540. Authentication module 530 may then send the consumer key, the request token, and the group credentials to content provider server system 516 to receive a verification code from content provider server system 516. Thus, in this example authentication module 530 deems the sender identifier 536 authenticated and sends authentication data 556 to server system 502 after completion of the first step authentication (e.g., via SPF or SID protocols) and a second step authentication process (e.g., via OAuth or an OAuth-like protocol). Responsive to receipt of authentication data 556, server system continues processing of the email communication 532 request to print for-pay content 544.

In another example, the sender identifier authentication procedure includes the authentication module 530 sending a second email communication 558 addressed to the sender identifier 536 included in the first email communication 532. The second email 558 includes a hyperlink to a sender identifier authentication service 554, or a request that a user validate the user's identity via the authentication service. For example, if the first email communication received at server system 502 includes a sender identifier "User1@Domain1.com" 236 (FIG. 4), the second email 558 is an email sent to "User1@Domain1.com" with a hyperlink to an authentication server system 554, e.g., a "Domain1.com authentication verification service." The user 540 may activate the hyperlink via a mouse, keyboard, touchpad, or other user interface device at computing device 514 or another computing device.

Upon the authorization service's 554 receipt of the request via the hyperlink, the service 554 sends authentication data 556 to server system 502. The authentication data 556 confirms the validity of the sender identifier 536, e.g., that the sender identifier 536 is recognized as a valid identifier for a user 540 that is an employee of Domain1 Company. The data 556 may additionally confirm that the network and/or internet pathway that the first email communication traveled is an expected pathway for this identifier 536. In embodiments, the sending of the request from server system 502 and the receipt of the confirmation at server system 502 may be via request and the authentication data may be via a networking protocol, including but not limited to Transmission Control Protocol/Internet Protocol ("TCP/IP"), HyperText Transfer Protocol ("HTTP"), Simple Mail Transfer Protocol ("SMTP"), Extensible Messaging and Presence Protocol ("XMPP") and/or Session Initiation Protocol ("SIP"). In other examples, the sending of the request from server system 502 is not via a hyperlink, e.g., the sending is accomplished by the user 540 sending a third email to the authentication server system 554 pursuant to an instruction to the user 540 contained as text within the second email 558.

In one embodiment, the authentication module 530 performs the authentication procedure described in the preceding two paragraphs after having first determined that the sender identifier 536 is not SPF or SID enabled. In another embodiment, authentication module 530, after performing the authentication procedure described in the preceding two paragraphs, conducts an additional sender identifier 536 authentication process. In examples, the additional sender identifier 536 authentication process may be via the OAuth protocol described previously in this application, via another OAuth protocol, or via another authorization protocol.

Associations database 542 holds a set of sender identifiers, and payment subscriptions authorizing printing of content are held and associated with at least some of the identifiers. Association module 524 compares the sender identifier 536 included within first email communication 532 to the associations database 542. Association module 542 confirms that sender identifier 536 is included in the set of identifiers held at the associations database 542, and that the identifier 536 is associated with a payment subscription.

Preparation module 526, in response to receipt of data from the authentication module indicating that the sender identifier is authenticated, and from the association module 524 indicating the sender identifier 536 is associated with a payment subscription 408, obtains the content 544 from content provider server system 516. The content is rasterized to render the content to a format that can be understood, or better understood, by printer 504. Following completion of the raster processing, preparation module 526 sends the rasterized content 546 to printer 504 for printing. Printer 504 in turn produces as output printed content 548.

Payment module 528 obtains from associations database 542 a payment protocol 412 (FIG. 4) associated with the sender identifier 536 and/or payment subscription. In this example the payment protocol 412 is an instruction to obtain payment via sending a charge request 562 for payment to a credit card payment server system #78910 552 identified in the payment protocol. In other examples, the payment service may be a debit card service, an online money transfer service such as PayPal™, or other form of payment service. Responsive to receipt of the request, payment server 552 sends to server system 502 a payment 564 or a confirmation of payment.

The functions and operations described with respect to for-pay printing service 508 and server system 502 may be implemented as a computer-readable storage medium containing instructions executed by a processor (e.g., processor 510) and stored in a memory (e.g., memory 512). In a given implementation, processor 510 may represent multiple processors, and memory 512 may represent multiple memories.

Figure 6:
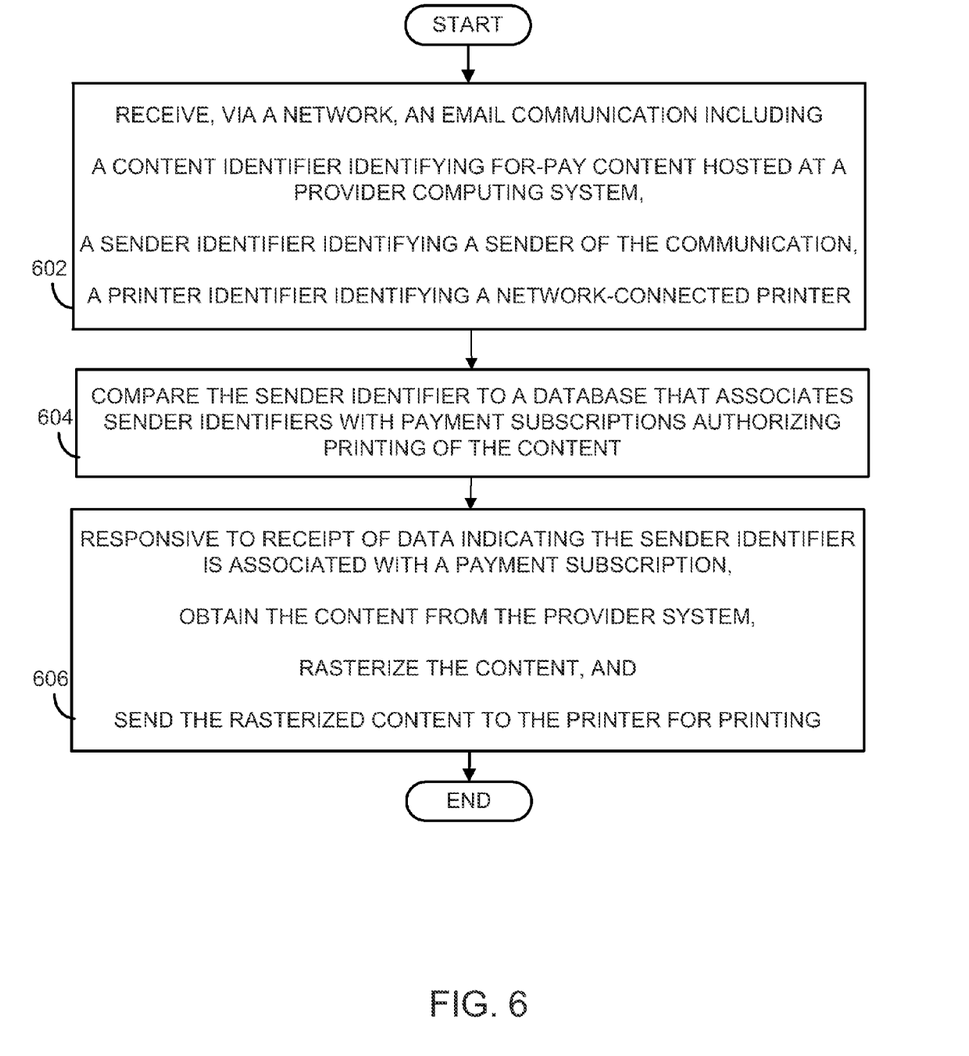
FIG. 6 is a flow diagram depicting steps taken to implement various embodiments.

FIG. 6 is a flow diagram of operation in a system according to various embodiments. In discussing FIG. 6, references may be made to the diagram of FIGS. 2 and 5 to provide contextual examples. Implementation, however, is not limited to those examples. Starting with FIG. 6, an email communication is received via a network. The email communication includes a content identifier identifying for-pay content hosted at a provider computing system, a sender identifier identifying a sender of the communication, and a printer identifier identifying a network-connected printer (block 602). Referring back to FIGS. 2 and 5, email receipt module 222 or 522 may be responsible for implementing block 602.

Continuing with the flow diagram of FIG. 6, the sender identifier is compared to a database that associates sender identifiers with payment subscriptions. The payment subscriptions are subscriptions authorizing printing of the content (block 604). Referring back to FIGS. 2 and 5, association module 224 or 524 may be responsible for implementing block 604.

Continuing with the flow diagram of FIG. 6, responsive to receipt of data indicating the sender identifier is associated with a payment subscription, the content is obtained from the provider system, rasterized, and sent to the printer for printing (block 606). Referring back to FIGS. 2 and 5, preparation module 226 or 526 may be responsible for implementing block 606.

Although the flow diagram of FIG. 6 shows specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present disclosure.

Various modifications may be made to the disclosed embodiments and implementations without departing from their scope. Therefore, the illustrations and examples herein should be construed in an illustrative, and not a restrictive, sense.

What is claimed is:

1. A non-transitory computer-readable storage medium containing instructions to enable email-based printing of for-pay content, the instructions when executed by a processor of a server causing the processor to perform the steps of:

receiving a plurality of payment subscriptions, wherein each payment subscription authorizes the printing of the for-pay content;
associating a plurality of sender identifiers with the received payment subscriptions;
associating a plurality of content identifiers with the for-pay content;
storing the associated sender identifiers and content identifiers in a database;
receiving via a network a communication including:
a content identifier identifying for-pay content hosted at a content provider computing system,
a sender identifier identifying a sender of the communication,
a printer identifier identifying a printer connected to the server via the network;
determining that the received sender identifier matches the stored sender identifier in the database and is associated with the received payment subscription;
obtaining the for-pay content from a content provider system;
rasterizinq the obtained for-pay content;
receiving payment for the for-pay content;
determining which printer is to receive the rasterized content from the received printer identifier;
sending the rasterized for-pay content from the server to the determined printer; and
printing the rasterized for-pay content at the determined printer.

2. The medium of claim 1, wherein the content identifier includes a URL address for the content.

3. The medium of claim 1, wherein the server is an end recipient of the email communication.

4. The medium of claim 1, wherein the instructions further cause the processor to perform the steps of:
obtaining from the database a payment protocol associated with the subscription, and
obtaining payment for the for-pay content pursuant to the protocol.

5. The medium of claim 4, wherein payment is obtained via a request for payment sent to a payment service identified in the payment protocol or subscription.

6. The medium of claim 4, wherein payment is obtained via a charge to a prepaid account identified in the payment protocol or subscription.

7. The medium of claim 4, wherein obtaining payment is triggered by receipt of the content or by sending of the content to the printer.

8. The medium of claim 4, wherein the instructions further cause the processor to perform the step of:
obtaining from the printer data regarding the printing of the content, and wherein obtaining payment is triggered by the data.

9. The medium of claim 1, wherein the instructions further cause the processor to perform the steps of:
determining that the received sender identifier is authentic;
based on a determination that the received identifier is authentic, obtaining of the for-pay content, rasterizinq of the for-pay content and sending of the for-pay content to the determined printer.

10. The medium of claim 9, wherein the authentication procedure includes confirming that a domain included within the communication is SPF or SID enabled.

11. The medium of claim 9, wherein the authentication procedure includes authenticating the sender identifier via an authorization protocol.

12. The medium of claim 9, further comprising instructions to perform the steps of:
    sending a second email communication addressed to the sender identifier, the communication including a hyperlink to a sender identifier authentication service;
    receiving data from the service authenticating the sender identifier.

13. The medium of claim 9, comprising instructions to perform the steps of:
    sending a second email communication addressed to the sender identifier, the communication including an instruction to send a third email to a sender identifier authentication service;
    receiving data from the service authenticating the sender identifier.

14. A system to enable email-based printing of for-pay content, comprising:
    a server processor;
    instructions stored on a non-transitory medium, when executed by the server processor, causes the server processor to perform the steps of:
    receiving a plurality of payment subscriptions, wherein each payment subscription authorizes printing of for-pay content;
    associating a plurality of sender identifiers with the received payment subscriptions;
    associating a plurality of content identifiers with the for-pay content;
    storing the associated sender identifiers and content identifiers in a database;
    receiving via a network a communication including:
    a content identifier identifying for-pay content hosted at a content provider computing system,
    a sender identifier identifying a sender of the communication,
    a printer identifier identifying a printer connected to the server via the network;
    determining that the received sender identifier matches the stored sender identifier in the database and is associated with the received payment subscription;
    obtaining the for-pay content from a content provider system;
    rasterizing the obtained for-pay content;
    receiving payment for the for-pay content;
    determining which printer is to receive the rasterized content from the received printer identifier;
    sending the rasterized for-pay content from the server to the determined printer; and
    printing the rasterized for-pay content at the determined printer.

15. The system of claim 14, further comprising stored instructions that performs the step of:
    obtaining from the database a payment protocol associated with the subscription, and
    obtaining payment for the content pursuant to the protocol.

16. The system of claim 14, wherein payment is obtained via a request for payment sent to a payment service identified in the payment protocol or subscription.

17. The system of claim 14, wherein payment is obtained via a debit to a prepaid account identified in the payment protocol or subscription.

18. The system of claim 14, further comprising stored instructions that performs the step of:
    performing a sender identifier authentication procedure.

19. The system of claim 18, wherein the authentication procedure includes stored instructions that performs the step of:
    sending a first email communication addressed to the sender identifier, the communication including a hyperlink to a sender identifier authentication service;
    receiving a second email communication from the service authenticating the sender identifier.

20. A method comprising:
    receiving, by a server, a plurality of payment subscriptions, wherein each payment subscription authorizes printing of for-pay content;
    associating, by the server, a plurality of sender identifiers with the received payment subscriptions;
    associating, by the server, a plurality of content identifiers with the for-pay content;
    storing, by the server, the associated sender identifiers and content identifiers in a database;
    receiving, by the server, via a network a communication including:
    a content identifier identifying for-pay content hosted at a content provider computing system,
    a sender identifier identifying a sender of the communication,
    a printer identifier identifying a printer connected to the server via the network;
    determining, by the server, that the received sender identifier matches the stored sender identifier in the database and is associated with the received payment subscription;
    obtaining, by the server, the for-pay content from a content provider system;
    rasterizing, by the server, the obtained for-pay content;
    receiving, by the server, payment for the for-pay content;
    obtaining, by the server, from the database a payment protocol associated with the received payment subscription;
    determining, by the server, which printer is to receive the rasterized content from the received printer identifier;
    sending, by the server, the rasterized for-pay content to the determined printer;
    printing the rasterized for-pay content at the determined printer; and
    obtaining, by the server, payment for the content pursuant to the obtained payment protocol.

* * * * *

UNITED STATES PATENT AND TRADEMARK OFFICE
CERTIFICATE OF CORRECTION

| | | |
|---|---|---|
| PATENT NO. | : 9,195,416 B2 | Page 1 of 1 |
| APPLICATION NO. | : 13/277023 | |
| DATED | : November 24, 2015 | |
| INVENTOR(S) | : Bhatia | |

It is certified that error appears in the above-identified patent and that said Letters Patent is hereby corrected as shown below:

In the claims,

In column 10, line 23, in Claim 1, delete "rasterizinq" and insert -- rasterizing --, therefor.

In column 10, line 59, in Claim 9, delete "rasterizinq" and insert -- rasterizing --, therefor.

Signed and Sealed this
Twenty-second Day of March, 2016

Michelle K. Lee
*Director of the United States Patent and Trademark Office*